United States Patent

[11] 3,617,236

[72] Inventor Elmer E. Elias
 2022 Thibodo Road, Vista, Calif. 92083
[21] Appl. No. 756,421
[22] Filed Aug. 30, 1968
[45] Patented Nov. 2, 1971

[54] METHOD OF MAKING ORGANIC COMPOST MATERIAL
 2 Claims, No Drawings
[52] U.S. Cl. .................................................. 71/9, 71/14, 71/17, 71/19, 71/21
[51] Int. Cl. ................................................ C05f 11/08
[50] Field of Search ........................................... 71/9, 10, 14, 17, 19–22

[56] References Cited
UNITED STATES PATENTS

| | | | |
|---|---|---|---|
| 2,867,521 | 1/1959 | Jeffreys | 71/10 |
| 2,947,619 | 8/1960 | Gorby | 71/9 |
| 3,102,804 | 9/1963 | Engelhart | 71/17 |

Primary Examiner—Reuben Friedman
Assistant Examiner—Charles N. Hart
Attorney—Baldwin, Egan, Walling & Fetzer ABSTRACT: Organic composts are prepared by mixing finely ground organic material such as grass, manure and bones with raw animal blood from slaughter houses, the resultant mixture ground to a certain moisture content and thereafter mixed and aerated for at least 4 days at a temperature of at least 90° F. to provide a final compost product having a moisture content of about 4 to 12 percent by weight.

METHOD OF MAKING ORGANIC COMPOST MATERIAL

It is an object of the present invention to provide new and improved method of making an organic compost material.

It is an object of the present invention to provide a method of preparing a rich organic compost material by mixing raw animal blood with an organic material including grass, leaves, manure, bones and paper, grinding the resultant mixture to a certain moisture content, and mixing and aerating the ground mixture for at least 4 days to provide a final compost product having a moisture content of approximately 4 to 12 percent by weight.

The present invention provides a method of making an organic compost material by (1) mixing raw animal blood in an amount generally of about 10 to 100 parts and preferably 20 to 50 parts by weight with 100 parts by weight of an organic material having a mesh size generally of about 20 to 100 and preferably 30 to 60, (2) grinding the resultant mixture to a moisture content generally of about 20 to 40 percent by weight and preferably at least about 25 to 30 percent, and (3) mixing and aerating the resultant ground mixture at a temperature generally of about 90° to 160° F. and preferably 115° to 135° F. for at least 4 days and preferably 5 to 6 days or more to provide a final rich organic compost product having a moisture content of about 4 to 12 percent by weight although a moisture content of about 6 to 8 percent is highly preferred, the best results being obtained at about 7 percent.

Suitable organic starting materials are paper, grass, garbage, bones, manure, coffee grounds and other organic materials that can be readily shredded or ground to a finely divided material, the starting mesh size being about 20 to 100 mesh.

Suitable raw animal blood is blood from slaughter houses and includes blood from cattle, horses, pigs, sheep, goats and other animals slaughtered for food, etc.

The organic material is ground to a mesh size of about that like of ground coffee, after which this raw blood is added and the grinding continued until the ground material is of a powdery consistency and the moisture content is preferably about 30 percent by weight. If the moisture content gets too low, say around 5 percent or under about 10 percent, the bacteria life apparently ceases. If the content is too high, say over about 50 percent, the bacterial activity ceases because the high moisture content destroys the bacteria.

Proper mixing and aeration of the ground blood/organic material mixture reduces the odor to a level that it is not a problem. During the mixing and aeration period, the material should be thoroughly aerated several times a day and preferably every 2 to 4 hours the first day or two.

The compost can be prepared on the site or conveniently in a truck bed. The amounts of starting materials can be easily controlled and the compost made richer by the use of more raw blood, the more blood that is used the richer the mixture.

The following example is intended to illustrate and not limit the invention:

EXAMPLE

A mixture of grass clippings, manure and bones was thoroughly mixed and ground to about a 10 mesh size or about that of ground coffee. The mixture with about eight parts grass to one part each of manure and bones was further ground and shredded and aerated to a powdery consistency of about 20–100 mesh in size. Thereafter, 100 parts of the above powdery material was mixed with 50 parts of raw animal blood that is a waste product from slaughter houses. The mixture of organic material and blood was further ground to a moisture content of about 30 percent by weight.

The above mixture of organic material and blood was further mixed and aerated at a temperature of about 100° F. over a 5 day period until the moisture content was approximately 7 percent.

The resultant decomposed material was used as an organic compost on one of two substantially identical trees. The tree treated with the above organic compost grew to about twice the size as the untreated tree.

In the above example, other organic material including animal wastes and garbage, previously described as being useful, can be used in place of the organic material used to provide substantially equivalent results. Likewise, raw animal blood from pigs and other animals, previously described as useful, can be used in place of the animal blood used to provide substantially equivalent results.

It is to be understood that various modifications of the present invention can be made without departing from the scope and spirit thereof.

I claim:

1. A method of making an organic compost material comprising the steps of:
   A. mixing about 100 parts by weight of solid organic material having a particle size of about 40 mesh with about 30 parts by weight of raw animal blood;
   B. grinding the mixture of step A to provide a ground mixture having a moisture content of about 30 percent by weight; and
   C. mixing and aerating the mixture of step B at a temperature of about 100° F. for about 5 days to provide a solid organic compost material having a moisture content of about 7 percent by weight.

2. A method as defined in claim 1 in which the organic material is a mixture of grass, manure and bones.

* * * * *